(12) United States Patent
Thuresson et al.

(10) Patent No.: US 10,266,659 B2
(45) Date of Patent: Apr. 23, 2019

(54) CROSSLINKED SILOXANYL POLYMER COMPOSITIONS

(71) Applicant: RAMLAT LIMITED, Msida (MT)

(72) Inventors: Staffan Thuresson, Halmstad (SE); Jonas Modell, Halmstad (SE); Krister Thuresson, Halmstad (SE)

(73) Assignee: Ramlat Limited, Msida (MT)

(*) Notice: Subject to any disclaimer, the term of this patent is extended or adjusted under 35 U.S.C. 154(b) by 203 days.

(21) Appl. No.: 14/888,859

(22) PCT Filed: May 2, 2014

(86) PCT No.: PCT/EP2014/059019
§ 371 (c)(1),
(2) Date: Nov. 3, 2015

(87) PCT Pub. No.: WO2014/177710
PCT Pub. Date: Nov. 6, 2014

(65) Prior Publication Data
US 2016/0130405 A1    May 12, 2016

(30) Foreign Application Priority Data
May 3, 2013  (GB) .................................. 1308072.6

(51) Int. Cl.
| | | |
|---|---|---|
| *C08K 5/55* | (2006.01) | |
| *C08G 77/56* | (2006.01) | |
| *C08K 7/28* | (2006.01) | |
| *C08K 5/5415* | (2006.01) | |
| *C08K 5/5419* | (2006.01) | |
| *C08L 83/04* | (2006.01) | |
| *C08K 3/38* | (2006.01) | |
| *C08L 83/00* | (2006.01) | |
| *C08G 77/16* | (2006.01) | |
| *C08G 77/18* | (2006.01) | |

(52) U.S. Cl.
CPC ................. *C08G 77/56* (2013.01); *C08K 3/38* (2013.01); *C08K 5/5415* (2013.01); *C08K 5/5419* (2013.01); *C08K 5/55* (2013.01); *C08K 7/28* (2013.01); *C08L 83/00* (2013.01); *C08L 83/04* (2013.01); *C08G 77/16* (2013.01); *C08G 77/18* (2013.01); *C08K 2003/387* (2013.01)

(58) Field of Classification Search
CPC ..... C08G 77/56; C08K 5/5415; C08K 5/5419
See application file for complete search history.

(56) References Cited

U.S. PATENT DOCUMENTS

| | | |
|---|---|---|
| 2,431,878 A | 12/1947 | McGregor et al. |
| 2,541,851 A | 2/1951 | Wright et al. |
| 2,568,672 A | 9/1951 | Warrick |
| 3,177,176 A | 4/1965 | Boot et al. |
| 3,677,997 A | 7/1972 | Kaiser et al. |
| 4,289,681 A | 9/1981 | Nauroth et al. |
| 4,371,493 A | 2/1983 | Minuto |
| 5,319,021 A | 6/1994 | Christy |
| 5,607,993 A | 3/1997 | Christy |
| 2010/0210785 A1 | 8/2010 | Modell et al. |
| 2011/0160104 A1* | 6/2011 | Wu .................... C04B 35/195 507/269 |
| 2012/0329896 A1 | 12/2012 | Bloomfield |
| 2018/0030247 A1* | 2/2018 | Thuresson ............... B44C 3/04 |

FOREIGN PATENT DOCUMENTS

| | | |
|---|---|---|
| WO | 2006070674 A1 | 7/2006 |
| WO | 2006/101440 A1 | 9/2006 |
| WO | 2008/020800 A1 | 2/2008 |
| WO | 2011/056832 A1 | 5/2011 |
| WO | 2013023174 A1 | 2/2013 |

OTHER PUBLICATIONS

Search Report in priority British Patent Application No. GB1308072.6, dated Nov. 5, 2013.
PCT/EP2014/059019, International Preliminary Report on Patentability (dated Nov. 3, 2015).
PCT/EP2014/059019, International Search Report (dated Jul. 17, 2014).
PCT/EP2014/059019, Written Opinion (dated Jul. 17, 2014).

* cited by examiner

*Primary Examiner* — Hannah J Pak
(74) *Attorney, Agent, or Firm* — LeClairRyan PLLC

(57) ABSTRACT

A polymeric composition comprising at least one covalently cross-linked siloxanyl polymer cluster which is further cross-linked by a boron compound, wherein the concentration of boron is in the range 0.005-0.160 wt. %.

23 Claims, 2 Drawing Sheets

CROSSLINKED SILOXANYL POLYMER COMPOSITIONS

CROSS-REFERENCE TO RELATED APPLICATIONS

This application is a 371 National Stage application of International PCT Application No. PCT/EP2014/059019, filed May 2, 2014, which claims priority to British Patent Application No. 1308072.6, filed May 3, 2013, all of which are incorporated herein by reference in their entirety.

FIELD OF THE INVENTION

The present invention relates to silicon-containing polymeric compositions characterized by low boron content. These compositions have the properties of a substance class described as, for example, a bounce clay, bouncing putty, or silly putty. The invention further relates to a composite material comprising the polymeric silicon-containing composition and further comprising a particulate or granular material in amounts ranging from small additions, to additions such that the particulate or granular material forms the vast majority by volume of the composite material. The invention also relates to methods for producing the silicon-containing polymeric compositions and composite materials. Materials comprising or consisting of the compositions of the invention are also provided.

BACKGROUND

Materials based on hydroxyl-terminated polydimethylsiloxane cross-linked via a boron-containing compound have found broad use and can be found in various patents and patent applications. Applications for these materials range from the automotive industry, for example, as resonance dampers, through therapeutic and rehabilitative uses, to uses as children's toys. They are also used in households and by hobbyists to remove dirt from various surfaces and as a masking medium when spray-painting.

U.S. Pat. No. 2,541,851 represents early work in the field and describes the use of various compounds of boron including pyroboric acid, boric anhydride, boric acid, borax and hydrolyzed esters of boric acid to form a solid, elastic product with a dimethyl silicon compound having two hydrolysable groups that have been hydrolyzed. Another material is described in U.S. Pat. No. 5,607,993 which discloses a so-called bounce clay. The bounce clay contains a proportion of particles having a filler function with the aim of lowering the density of the clay product. Another known material is described in WO 2008/020800 A1 which discloses a particulate or granular material with a silicone-based binder which is disposed as a coating on the particles or the grains.

However, it has recently been concluded that boron-containing compounds may have an adverse effect on the health of humans. Such compounds are therefore now classified as toxic for reproduction in the European Union, and the following boron-containing compounds have been added to the European Chemicals Agency (ECHA) candidate list: Diboron trioxide (CAS: 1303-86-2); Tetraboron disodium heptaoxide, hydrate (CAS: 12267-73-1); Boric acid (CAS: 10043-35-3, 11113-50-1); Disodium tetraborate, anhydrous (CAS: 1303-96-4, 1330-43-4, 12179-04-3).

If a substance on this list is present in a product in a concentration above 0.1 wt. % then that product will be subject to certain restrictions and the supplier will have obligations in relation to its safe use. Since some of the product substances can be difficult to analyze via common analytical techniques it is useful to recalculate the limitation in terms of the corresponding amounts of boron. An elemental analysis of boron content is usually straightforward to perform.

0.1 wt. % of diboron trioxide (CAS: 1303-86-2); Tetraboron disodium heptaoxide, hydrate (CAS: 12267-73-1); Boric acid (CAS: 10043-35-3, 11113-50-1); Disodium tetraborate, anhydrous (CAS: 1303-96-4, 1330-43-4, 12179-04-3) correspond to 0.031 wt. %; 0.020 wt. %; 0.017 wt. %t; 0.021 wt. % of boron, respectively.

Furthermore, following the European toy safety directive (2009/48/EC), boron is not allowed above 0.03 wt. % in certain product classes and not above 0.12 wt. % in certain other product classes. In all, recalculated to boron, the strictest limitation (boric acid) corresponds to 0.017 wt. % boron.

These limitations greatly hamper the use of materials based on hydroxy-terminated polydimethylsiloxane cross-linked via boron-containing compounds in many applications, and exclude their use in other applications, since the levels of boron are too high. For example, U.S. Pat. No. 2,541,851 claims a working range of the boron compound of between 5-25 wt. % based on the weight of the polymeric dimethylsiloxane, and U.S. Pat. No. 3,177,176 claims 1-10 wt. %.

Thus it is of great concern to find a silicon-containing composition having a boron content which can meet the regulations, i.e. is below the stipulated amounts, whilst maintaining the required properties of the compounds currently used in the art.

Various ways to manufacture the composite materials of the art, which are all characterized by having a boron content outside the scope of the new regulations, are known to the skilled worker. Often the process involves "cooking" the mixture for several hours. During the cooking operation a nitrogen blanket is spread over the mixture to prevent volatiles from burning or exploding. However, retaining the volatiles may result in a product which cannot demonstrate the necessary physical properties, for example having inadequate strength and/or rebound capability.

U.S. Pat. No. 4,371,493 describes a process based on dimethyl silicone gum which is claimed to result in lower rejection frequency. However, this process also requires heating to 150-260° C. for several hours, and the addition of boron compound in the range of 4-15 wt. %, which is above the amounts allowed by new European regulations.

U.S. Pat. No. 3,177,176 describes that it is preferable first to mix all components in a state of low viscosity, followed by an increase in temperature to between 90-250° C. until there is a sudden and substantial increase in viscosity. The working range of the boron compound is between 1-10 wt. %, which is again clearly above the amounts allowed by new European regulations.

US2012/0329896 discloses a process which comprises the addition of low levels of a boron-containing crosslinking agent to a polyorganosiloxane to form a borosilicone compound, crosslinking the resultant composition with a siloxane crosslinking agent, and curing the resultant mixture to form a viscoelastic silicone rubber composition.

However, compositions therein described have a permanent equilibrium shape, meaning that they will return to an equilibrium shape after being deformed. In addition, the curing time for such compositions is a period of several days.

Another general disadvantage with previously known manufacturing processes is the excess heating and prolonged reaction time that is needed before the reaction is completed. It would be a substantial advantage if the increase in viscosity could be initiated in a controlled and convenient way. It would also be desirable for the increase in viscosity to commence shortly after the initiation of the process, and furthermore without excessive heating.

SUMMARY OF THE INVENTION

The present invention relates to the development of new polymeric compositions, composite materials comprising said compositions, and methods for their preparation and use.

Viewed from a first aspect, the invention thus provides a polymeric composition comprising at least one covalently cross-linked siloxanyl polymer cluster which is further cross-linked by a boron compound, wherein the concentration of boron is in the range 0.005-0.160 wt. %. Preferably the cluster, prior to cross-linking with boron, may comprise on average more than one hydroxyl moiety per molecule, preferably at least two. The average molecular weight between branching points within the cluster preferably may be in the range 4-80 kD, more preferably 8-40 kD.

In one embodiment, applicable to all aspects of the invention, the cluster, prior to further cross-linking with boron, may comprise hydroxyl moieties at a concentration equivalent to 1-100 μmol [OH] per g of the cluster, preferably 5-50 μmol [OH] per g of the cluster. Preferably the cluster, prior to cross-linking with boron, may comprise hydroxyl moieties at an average concentration corresponding to 10-1000 kD of polymer cluster per hydroxyl moiety.

Preferably said polymer cluster may comprise at least one covalently cross-linked linear or branched siloxanyl polymer. Preferably said siloxanyl polymers, prior to covalent cross-linking, may comprise on average more than one hydroxyl moiety per molecule, preferably at least two, such as at least three.

In one embodiment, the polymer cluster may have a shear viscosity of between 10 and 2000 Pas at 23° C., preferably between 50 and 1000 Pas, all measured at a shear rate of 10 s$^{-1}$. In a further embodiment, the polymer cluster may have a shear modulus (G") greater than its elastic modulus (G') over the whole of a range of shear rates from 1 Hz to 10 Hz, preferably over the whole of a range from 0.1 Hz to 30 Hz (at 23° C.).

In one embodiment, applicable to all aspects of the invention, the siloxanyl polymer, prior to covalent cross-linking to form said cluster, may comprise hydroxyl moieties at a concentration equivalent to 20-2000 μmol [OH] per g of the polymer, and/or may comprise hydroxyl moieties at an average concentration corresponding to 0.5-50 kD of polymer per hydroxyl moiety.

In a preferred embodiment, applicable to all aspects of the invention, the polymer cluster may comprise at least one siloxanyl polymer covalently cross-linked with at least one siloxy-containing compound.

It is preferred that prior to covalent cross-linking the siloxanyl polymer has the structure:

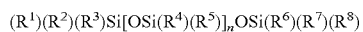

wherein n is an integer and preferably may be in the range 30-1000, more preferably 40-650, especially about 50 to about 500; and
wherein each of $R^1$-$R^8$ may be the same or different and is independently selected from the group consisting of hydrogen, methyl, ethyl, propyl, butyl, phenyl, vinyl and hydroxyl, preferably hydrogen, methyl, vinyl and hydroxyl, especially methyl and hydroxyl; and
wherein at least one of $R^1$-$R^8$ is hydroxyl, preferably at least two. More preferably at least one of $R^1$, $R^2$, $R^3$, $R^6$, $R^7$ and $R^8$ is hydroxyl. In a preferred embodiment, applicable to all aspects of the invention, at least one of $R^1$, $R^2$ and $R^3$, and at least one of $R^6$, $R^7$ and $R^8$ are hydroxyl.

For example, said siloxanyl polymer may be selected from the group consisting of polydiphenylsiloxane, polydibutylsiloxane, polydipropylsiloxane, polydibutylsiloxane, polydiethylsiloxane, polydimethylsiloxane, and hydroxy-functionalised compounds thereof, preferably the group consisting of polydimethylsiloxane and hydroxy-functionalised compounds thereof. It is preferred that the hydroxy-functionalised compounds comprise at least one terminal hydroxyl group.

Preferably the siloxy-containing compound may be selected from the group consisting of acetoxysilanes, oximosilanes, alkoxysilanes, isopropenoxysilanes, amidosilanes, aminosilanes, aminoxysilanes and siloxanyl polymers functionalised with at least one of these groups, preferably the group consisting of acetoxysilanes, alkoxysilanes, acetoxy-functionalised polymers and alkoxy-functionalised siloxanyl polymers. More preferably said siloxy-containing compound is selected from the group consisting of tetraacetoxysilane, triacetoxy methylsilane, triacetoxy ethylsilane, tetraethyl silicate acetoxy-functionalised polydimethylsiloxane and alkoxy-functionalised polydimethylsiloxane.

It is preferred that the boron compound is selected from triethyl borate, diboron trioxide, tetraboron disodium heptaoxide, disodium tetraborate and boric acid.

Preferably the compositions of the invention have a concentration of boron that is less than 0.12 wt. %, preferably less than 0.03 wt. %, more preferably less than 0.017 wt. %. For example in the range 0.005-0.11 wt. %, preferably 0.010-0.016 wt. %.

In one aspect the compositions of the invention may comprise at least two siloxanyl polymers, each of which is covalently cross-linked with at least one siloxy-containing compound. The siloxy-containing compounds may be independently selected for each siloxanyl polymer and may be the same or different.

It is preferred that, in all aspects and embodiments, the compositions of the invention have a Shore hardness on the Shore 00 scale in the range of 20 to 80, preferably 20 to 75, more preferably 20 to 60.

Preferably the compositions of the invention, in all aspects and embodiments, bounce. For example a 0.4 g ball formed thereof bounces to a height of at least 20 cm when dropped from a height of 2 m onto a flat glass surface.

Viewed from another aspect, the invention further provides a composite material comprising the polymeric composition of the invention. Preferably the composite materials of the invention may comprise at least 2 vol. % of the polymeric composition according to the invention, preferably 2-99 vol. %.

In a preferred embodiment applicable to all aspects of the invention, the composite material may further comprise at least 1 vol. %, for example 1-98 vol. % of a particulate or granular material.

In one embodiment, the composite material may comprise at least 80 vol. % of the said particulate or granular material, for example 80-98 vol. %, preferably 88-95 vol. %.

In a further embodiment, which is equally preferred, the composite material may comprise less than 80 vol. % of the particulate or granular material, preferably less than 75 vol.

%, more preferably less than 50 vol. %. For example 1-74 vol. %, preferably 5-49 vol. %, for example 10-40 vol. %.

Preferably, in all embodiments, the particulate or granular material has an average particle size in the range of 0.02-0.5 mm, preferably 0.05-0.25 mm, such as 0.075-0.15 mm.

It is preferred that the particulate or granular material is selected from the group consisting of borosilicate glass beads, sand, ground marble, polymer grains or balls, cenospheres, microspheres of plastic ceramics or glass, or mixtures of these materials.

In all embodiments, the polymeric composition or composite material of the invention may further comprise at least one additive selected from the group consisting of softeners, plasticizers, lubricants, pigments and colorants. Additives such as polyglycol or oleic acid may also be added.

Preferably such additives may be present in total at a maximum of 10 wt. % by weight of the polymeric composition or by weight of the composite material.

Viewed from a further aspect, the invention provides a bouncing putty or silly putty comprising the polymeric composition or composite material according to the invention.

Viewed from another aspect, the invention provides processes for the manufacture of the polymeric compositions and composite materials of the invention.

In one aspect the invention provides a process for the manufacture of a polymeric composition or composite material, comprising the steps of:
(i) reacting at least one siloxanyl polymer with a siloxy-containing cross-linking agent to form covalent cross-links;
(ii) reacting the covalently cross-linked polymer with a boron compound; and optionally
(iii) adding a particulate material.

In another aspect the invention provides a process for the manufacture of a composite material, said process comprising the steps of:
(i) reacting at least one siloxanyl polymer with a siloxy-containing cross-linking agent to form covalent cross-links;
(ii) adding a borosilicate particulate material; and
(iii) adjusting the pH of the mixture.

Adjusting the pH of the mixture may be conducted using an acid, preferably selected from carboxylic acids and HCl, more preferably HCl.

In a preferred embodiment applicable to all aspects of the invention, step (i) may be conducted at a temperature in the range 20-200° C., preferably 20-150° C., for example 130° C., more preferably in the range 20-100° C., for example 60-90° C. Preferably step (i) may have a reaction duration in the range of 5 minutes to 5 hours, more preferably approximately 15-90 minutes, for example 30-60 minutes.

Preferably step (i) may be a condensation reaction terminated before all hydroxyl moieties are consumed.

In a preferred embodiment applicable to all aspects of the invention, the ratio of siloxy-containing cross-linking agent to siloxanyl polymer in step (i) may be a molar ratio in the range 0.7:1 to 1.30:1, preferably 0.8:1 to 1.2:1, such as 0.9:1 to 1.1:1, especially approximately 1:1. Preferably said siloxy-containing cross-linking agent may be trifunctional and/or said siloxanyl polymer may be OH-endcapped.

Preferably the siloxanyl polymer, prior to step (i), comprises on average more than one hydroxyl moiety per molecule, preferably at least two.

Alternatively or in addition, the siloxanyl polymer may preferably comprise at least one hydrolysable group per molecule. Preferably such hydrolysable groups may be hydrolysed after step (i), preferably under acid-hydrolysis conditions. Typically suitable hydrolysable groups may be selected from amide groups and ester groups.

Preferably step (ii) may be conducted in a temperature in the range 5-200° C., preferably 10-150° C., more preferably in the range 20-80° C., for example about 50° C. Preferably step (ii) may have a reaction duration in the range of 5 seconds to 1 hour, preferably approximately 30 seconds to 10 minutes, for example 1-5 minutes.

Preferably the processes of the invention provide polymeric compositions and/or composite materials having a boron concentration in the range 0.005-0.160 wt. %.

It is preferred that the particulate material forms 1-98 vol. % of the composite material product produced by the processes of the invention.

In one embodiment, the composite material produced may comprise at least 80 vol. % of the particulate or granular material, for example 80-98 vol. %, preferably 88-95 vol. %.

In a further embodiment, which is equally preferred, the composite material produced may comprise less than 80 vol. % of the particulate or granular material, preferably less than 75 vol. %, more preferably less than 50 vol. %. For example 1-74 vol. %, preferably 5-49 vol. %, for example 10-40 vol. %.

The processes of the invention may provide polymeric compositions and/or composite materials according to the invention, having the features disclosed and described herein.

Viewed from a further aspect, the invention provides a polymeric composition or composite material obtainable by the processes of the invention.

Viewed from yet a further aspect, the invention provides the use of covalent cross-linking for the reduction of boron content in a polymeric composition or composite material, preferably a polymeric composition or composite material as defined herein.

In a further aspect the invention provides the use of a covalently cross-linked siloxanyl polymer in the provision of a polymeric composition or composite material having reduced boron content, preferably wherein said polymer, polymeric composition and composite material are as defined herein. Said compositions and/or composite materials preferably have properties as described herein, for example in respect of bounce and/or viscosity.

DETAILED DESCRIPTION OF THE INVENTION

The aspects and embodiments of the invention are described and defined in detail hereinafter. Where preferred embodiments or aspects of the invention are described, these are disclosed both individually and in combination with any and all other preferred embodiments and/or aspects of the invention. For example, if components A, B, C and D are disclosed as the components of a composition, and their preferred embodiments A1, B1, C1 and D1 are also disclosed, then compositions comprising any and all combinations and permutations of A, B, C, D, A1, B1, C1 and D1 are also disclosed.

Cross-Links

Cross-linking is used in synthetic polymer chemistry to refer to the "linking of polymer chains". The extent of cross-linking and specificities of cross-linking agents may vary. In the present invention there are two different types of cross-links required.

For the class of materials known as bounce clays, silly putties or bouncing putties, there is a well-known type of cross-link that typically forms between hydroxyl moieties attached to various siloxane-based arrangements and boron compounds, such as boric acid. These cross-links are essential for achieving the necessary physical properties for this class of materials. For example, the ability to exhibit elastic properties at short time scales but flow under gravity at longer time-scales. This type of cross-link is referred to herein as being non-permanent or dynamic. Such cross-links may form at "cross-linking points", typically provided by hydroxyl moieties on the polymer chains.

Dynamic cross-links are typically formed between a boron compound and the hydroxyl groups of the siloxanyl polymer.

The other type of cross-link relevant to the present invention is characterized by being covalent. Such cross-links are referred to herein as covalent cross-links or permanent cross-links. This type of cross-link is, for instance, the result of a condensation reaction between polydimethylsiloxane (PDMS) based structures comprising hydroxyl moieties, and cross-linking agents exemplified by acetoxysilanes and alkoxysilanes.

Traditionally a bouncing putty is based on hydroxy-terminated PDMS cross-linked via boric acid, i.e. containing dynamic cross-links via boron. Linear and branched PDMS may be used, as for example in U.S. Pat. No. 2,431,878. Without being bound by theory, it is believed that the essential properties of these materials depend on the dynamic character of the boron-based cross-links. These act as permanent bonds on a short time-scale but on a longer time-scale allow the materials to have liquid properties and flow under stress, because the cross-links can be reformed. Dynamic cross-linking by boric acid thus allows the materials simultaneously to be strongly cohesive, self-repairing and in part have fluid-like properties and therefore flow under gravity. As indicated by the name these materials have elastic properties on a shorter time-scale and bounce when dropped on a hard surface. As discussed above, however, the boron-content of known materials of this type is higher than allowed for under the new European regulations.

In theory various ways to reduce the boron content of the materials known in the art could be put forward. For example:

i) Reduce the amount of boron-containing compound. However, as shown in Example 1, simple reduction of the boron-content within the existing compositions simply results in loss of the necessary properties before the content of boron containing substance is sufficiently low to meet the regulatory standards.

ii) Decrease the number of cross-linking points needed by increasing the length of the PDMS chain between terminating hydroxyl-groups, for example by choosing a hydroxy-terminated PDMS with a higher molecular weight as starting material. In theory this would decrease the amount of boron-containing substance needed because the number of cross-linking points depends on the concentration of hydroxyl groups attached to the PDMS chains. Again, however, the material loses its desired properties before the content of boron is sufficiently low, as demonstrated in example 2.

iii) Increase the total weight of the material by adding inactive filler material. However, again the material loses the necessary properties before the content of boron containing substance is sufficiently low. See Example 3, for instance.

The current inventors have surprisingly found that it is possible to provide a material with a significantly reduced boron-content, whilst maintaining the desired physical properties. Thus a siloxanyl polymer cluster comprising covalent cross-links, subsequently cross-linked with boron to provide dynamic cross-links, according to the present invention, can meet the regulatory requirements and maintain the desired properties.

The introduced covalent cross-links in the siloxanyl polymer cluster do not possess the dynamic properties that characterizes cross-links between boron and hydroxyl moieties, for example cross-links between boric acid and hydroxy-terminated PDMS.

Without being bound by theory it is believed that the covalently cross-linked siloxanyl polymer cluster comprises a partly covalently-bound network, where the remaining hydroxyl groups form a functional part of the covalently-bound network. The remaining hydroxyl groups are thus at least partly accessible for traditional cross-linking and formation of dynamic cross-links via a boron-containing substance.

Siloxanyl Polymer Cluster

Siloxanyl polymer clusters (also referred to as "cluster" or "polymer cluster" herein) suitable in the polymeric compositions of the invention may be obtained by a variety of methods. For example, clusters may be formed by reaction from the primary units of silicones (polysiloxanes). Silicones are oligomeric or polymeric compounds in which silicon atoms are linked via oxygen and in which the silicon atoms have one or more organic substituents. The silicone backbone thus comprises alternating Si—O—Si linkages. The diversity of molecular structures in silicone chemistry derives from the many different ways in which the various structural units can be combined.

Structural units are designated M (monofunctional structural unit at chain end), D (difunctional linear structural unit within the chain), T (trifunctional structural unit with three-dimensional branching) and Q (tetrafunctional structural unit with four-dimensional branching). Siliones or polysiloxanes made up of D units (difunctional structural moieties) may be linear or cyclic, while combinations of T and Q units may produce densely branched network structures. Branched polysiloxanes may comprise a combination of M, D and T units.

Typically, siloxanyl polymer clusters suitable in the polymeric compositions of the invention may be formed by covalent cross-linking of siloxanyl polymers (polysiloxanes). Cross-linking with a siloxy-containing compound via condensation reaction, radical cross-linking, and Pt catalysed reactions between vinyl-containing siloxanyl polymers are examples of typical methods of obtaining suitable covalently cross-linked siloxanyl polymer clusters.

U.S. Pat. No. 2,568,672, for example, discloses peroxide-induced free-radical cross-linking. The peroxides may be vinyl-specific (DTBP, DTBPH, DCB) or non-specific (TBB, DBP, DCLBP). The former react with vinyl groups while the latter also attack the methyl-groups.

Other examples of suitable covalent cross-linking methods include:

Addition-curing (or Hydrosilylation), which typically may be based on Pt-catalysed reaction between alkenyl polysiloxanes and Si—H oligo-siloxanes (cross-linkers)—Example 8 herein is based on the similar dehydrocondensation where hydrogen gas is released when Si—H is reacted with Si—OH;

Condensation-curing, as used in several of the examples herein;

Vulcanization with sulfur of polysiloxanes rich in vinyl groups;

Radiation-induced curing;

Photo-initiated curing, which needs chromophoric groups either within the polysiloxane or an initiator which can be photo-initiated.

The covalently cross-linked siloxanyl polymer clusters may be provided by one or more of addition-curing, condensation-curing, vulcanization, radiation-induced curing, and/or photo-initiated curing. Preferably condensation-curing and/or addition-curing may be used to prepare the siloxanyl polymer clusters.

The covalently cross-linked siloxanyl polymer clusters according to the invention contain at least one branching point. A branching point is defined herein as the junction of siloxanyl polymer chains or branches, i.e. the point at which at least three chains or branches are joined together, preferably by a covalent cross-link. For example, a siloxanyl polymer cluster may comprise on average at least two branching points, such as 3-10 branching points e.g. 4, 5 or 6 branching points.

Typical siloxanyl polymer clusters may have an average molecular weight between branching points within said cluster in the range 4-80 kD, for example, a range of 15-60 kD. A range of 5-50 kD, such as 8-40 kD, may be preferred.

Siloxanyl polymer clusters according to the invention may comprise on average more than one hydroxyl moiety per cluster, preferably at least two hydroxyl moieties per cluster. For example, suitable clusters may comprise at least three hydroxyl moieties.

In one embodiment, applicable to all aspects of the invention, the polymer cluster, prior to further cross-linking with boron, may comprise hydroxyl moieties at a concentration equivalent to 1-100 µmol [OH] per g of the cluster, preferably 5-50 µmol [OH] per g of the cluster.

Preferably the cluster, prior to cross-linking with boron, may comprise hydroxyl moieties at an average concentration corresponding to 10-1000 kD of polymer cluster per hydroxyl moiety. For example, 50-500 kD of polymer cluster per hydroxyl moiety.

Siloxanyl Polymer

Preferably said polymer cluster may comprise at least one linear or branched siloxanyl polymer. Preferably said siloxanyl polymers, prior to cross-linking to form said cluster, may comprise on average more than one hydroxyl moiety per molecule, preferably at least two, such as at least three.

In one embodiment, applicable to all aspects of the invention, the siloxanyl polymer, prior to cross-linking to form said cluster, may comprise hydroxyl moieties at a concentration equivalent to 20-2000 µmol [OH] per g of the polymer, and/or may comprise hydroxyl moieties at an average concentration corresponding to 0.5-50 kD of polymer cluster per hydroxyl moiety.

Preferably the concentration of hydroxyl moieties may be in the range 22-500 µmol [OH] per g of polymer, for example 25-250 µmol [OH] per g of polymer, and/or hydroxyl moieties at an average concentration corresponding to 2-45 kD of polymer per hydroxyl moiety, for example 4-40 kD of polymer per hydroxyl moiety.

Preferably suitable siloxanyl polymers may have a number average molecular weight ($M_N$) in the range of 2 kD to 100 kD. More preferably $M_N$ may be in the range 3 kD to 50 kD, for example 4 kD to 40 kD, preferably 10-25 kD, such as around 15-20 kD.

Suitable siloxanyl polymers, prior to cross-linking, may typically have a viscosity in the range of 0.025-20 Pas at 20° C. (25-20000 cP), preferably 0.100-18 Pas at 20° C. (100-18000 cP).

Prior to cross-linking, suitable polymers typically comprise on average more than one hydroxyl moiety per molecule, preferably at least two hydroxyl moieties per molecule. Suitable polymers may be end-capped with —OH moieties, and/or may comprise non-terminal —OH groups.

Preferably a suitable linear siloxanyl polymer, prior to cross-linking, may have the structure:

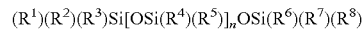

wherein n is an integer and preferably is in the range 30-1000, and wherein each of $R^1$-$R^8$ may be the same or different and is independently selected from the group consisting of hydrogen, methyl, ethyl, propyl, butyl, phenyl, vinyl, trifluoropropyl and hydroxyl, wherein at least one of $R^1$-$R^8$ is hydroxyl.

A typical branched siloxanyl polymer, prior to cross-linking, may have the formula:

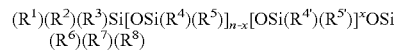

wherein n is an integer and preferably is in the range 30-1000 and x is an integer and preferably is in the range 1-20. Units of formula $[OSi(R^{4'})(R^{5'})]$ may be adjacent in the polymer backbone and/or may be interspersed with units of the formula $[OSi(R^4)(R^5)]$. Preferably each $[OSi(R^{4'})(R^{5'})]$ unit is separated by at least one $[OSi(R^4)(R^5)]$ unit, more preferably by 1-500 $[OSi(R^4)(R^5)]$ units, for example by 1-50 $[OSi(R^1)(R^5)]$ units. Each of $R^1$-$R^8$ may be the same or different and is independently selected from the group consisting of hydrogen, methyl, ethyl, propyl, butyl, phenyl, vinyl, trifluoropropyl and hydroxyl. At least one of $R^1$-$R^8$ is hydroxyl. At least one of $R^{4'}$ and $R^{5'}$ is a polymer chain, the other being selected from the group consisting of hydrogen, methyl, ethyl, propyl, butyl, phenyl, vinyl, trifluoropropyl and hydroxyl, preferably hydrogen and methyl. Preferably at least one of $R^{4'}$ and $R^{5'}$ is a polymer chain having a repeating unit of the formula $[OSi(R^4)(R^5)]$ where $R^4$ and $R^5$ are as previously defined.

In one embodiment, applicable to all aspects of the invention, the branched siloxanyl polymer, prior to cross-linking, may have the formula:

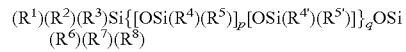

wherein q is an integer and preferably is in the range 1-20, and p has an average value equal to [(30-1000)/q]. Each of $R^1$-$R^8$ may be the same or different and is independently selected from the group consisting of hydrogen, methyl, ethyl, propyl, butyl, phenyl, vinyl, trifluoropropyl and hydroxyl. At least one of $R^1$-$R^8$ is hydroxyl. At least one of $R^{4'}$ and $R^{5'}$ is a polymer chain, the other being selected from the group consisting of hydrogen, methyl, ethyl, propyl, butyl, phenyl, vinyl, trifluoropropyl and hydroxyl, preferably hydrogen and methyl. Preferably at least one of $R^{4'}$ and $R^{5'}$ is a polymer chain having a repeating unit of the formula $[OSi(R^4)(R^5)]$ where $R^4$ and $R^5$ are as previously defined.

It is preferred that n is in the range 40-650, especially about 50 to about 500.

For branched siloxanyl polymers it is preferred that x may be in the range 5-10.

It is preferred that each of $R^1$-$R^8$ may be independently selected from the group consisting of hydrogen, methyl, vinyl and hydroxyl, preferably methyl and hydroxyl. At least one of $R^1$-$R^8$ is hydroxyl, preferably at least two.

In a preferred embodiment, applicable to all aspects of the invention, $R^4$ and $R^5$ are methyl.

Preferably at least one of $R^1$, $R^2$, $R^3$, $R^6$, $R^7$ and $R^8$ is hydroxyl.

In a preferred embodiment applicable to all aspects of the invention, at least one of $R^1$, $R^2$ and $R^3$, and/or at least one of $R^6$, $R^7$ and $R^8$ is hydroxyl.

Preferably said siloxanyl polymer may be selected from the group consisting of polydiphenylsiloxane, polydibutylsiloxane, polydipropylsiloxane, polydibutylsiloxane, polydiethylsiloxane, polydimethylsiloxane, and hydroxy-functionalised compounds thereof, preferably the group consisting of polydimethylsiloxane and hydroxy-functionalised compounds thereof.

In a preferred embodiment applicable to all aspects of the invention, the siloxanyl polymer may be linear or branched polydimethylsiloxane comprising at least one terminal hydroxyl group, and/or at least one hydroxyl side group. For example, at least one of $R^1$, $R^2$ and $R^3$, and/or at least one of $R^6$, $R^7$ and $R^8$ is hydroxyl, and in addition at least one of $R^4$ and $R^5$ is hydroxyl.

Any siloxanyl-based molecular arrangement characterized by having hydroxyl-functionality, which is at least partly accessible for cross-linking via a boron containing substance, may be functional to produce the compositions of the invention. In a preferred embodiment applicable to all aspects of the invention, the siloxanyl polymer is a linear PDMS terminated with at least one hydroxyl group.

Alternatively or in addition, the functional groups can be hydrolysable groups that are hydrolyzed just before cross-linking via a boron containing substance. Preferably the siloxanyl polymer covalently cross-linked with the siloxy-containing compound comprises at least one hydrolysable group instead of or in addition to at least one hydroxyl-group.

The properties of the polymeric composition may be influenced by the characteristics of the siloxanyl polymer that is used as starting material. For example, a hydroxyl-terminated siloxanyl polymer having short chains or a high level of hydroxyl substituents relative to alkyl substituents, may result in a relatively hard and cohesive or sometimes crumbly final product. A long-chain hydroxyl-terminated siloxanyl polymer, or a siloxanyl polymer having a low level of hydroxyl substituents relative to alkyl substituents, may result in a relatively soft and sometimes tacky final product.

In one embodiment applicable to all aspects of the invention a mixture of long-chain and short-chain siloxanyl polymers may be used. For example, at least one polymer where n is in the range 300-500, in combination with at least one polymer where n is in the range 30-150.

Alternatively, or in addition, in an equally preferred embodiment, applicable to all aspects of the invention, a mixture of intermediate-chain polymers may be used, such as at least two polymers having values of n in the range 150-300. For example, at least one polymer where n is in the range 170-230, in combination with at least one polymer where n is in the range 230-290, such as one polymer where n is approximately 200 and another where n is approximately 270.

The polymeric composition may comprise at least two siloxanyl polymers as set out above, each of which is covalently cross-linked with at least one siloxy-containing compound. The siloxy-containing compounds may be independently selected for each siloxanyl polymer and may be the same or different. Preferably the polymeric composition may comprise a mixture of long-chain and short-chain siloxanyl polymers, for example at least one long-chain and at least one short chain siloxanyl polymer. Alternatively or in addition, and equally preferably, the polymeric composition may comprise or further comprise a mixture of intermediate-chain siloxanyl polymers.

Siloxy-Containing Compounds

Various siloxy-containing compounds that give covalent cross-links may be used. The siloxy-containing compound must be capable of forming covalent cross-links, as defined herein, with the siloxanyl polymer. Siloxy-containing compounds are also referred to herein as siloxy-containing cross-linking agents.

A preferred combination of siloxanyl polymer and siloxy-containing compound is characterized by having the capability to form at least partial networks, or branched structures having hydroxyl functionality, as opposed to combinations that may only form linear polysiloxane structures having hydroxyl terminations.

In a preferred embodiment applicable to all aspects of the invention, the siloxy-containing compound may be trifunctional or tetrafunctional.

Suitable siloxy-containing compounds acting as covalent cross-linking agents can be exemplified by siloxy-containing low molecular weight compounds (acetoxysilanes and alkoxysilanes such as; tetraacetoxysilane, triacetoxy methylsilane; triactetoxy ethylsilane, or tetraethyl silicate), or by siloxy-containing compounds with higher molecular weights (such as a PDMS with acetoxy or alkoxy functional groups).

Preferably the siloxy-containing compound is selected from the group consisting of acetoxysilanes, alkoxysilanes, acetoxy-functionalised siloxanyl polymers and alkoxy-functionalised siloxanyl polymers.

More preferably the siloxy-containing compound is selected from the group consisting of tetraacetoxysilane, triacetoxy methylsilane, triacetoxy ethylsilane, tetraethyl silicate, acetoxy-functionalised polydimethylsilane and alkoxy-functionalised polydimethylsiloxane.

Cross-linking between the siloxanyl polymer and the siloxy-containing compound preferably occurs via condensation reaction.

In the examples herein, a triacetoxy ethylsilane, supplied by Wacker Chemie AG under the trade name WACKER® CROSS-LINKER ES 23 has been used as the siloxy-containing cross-linking agent. The cross-linker is trifunctional and reacts with the hydroxyl groups of the hydroxyl-terminated PDMS in a condensation reaction releasing acetic acid.

Preferably around 0.5-15 wt. %, e.g. approximately 0.9 wt. % or approximately 3.9 wt. %, preferably 1-10 wt. %, for example 2-5 wt. %, such as around 4 wt. %, of siloxy-containing compound may be used to form the covalently cross-linked siloxanyl polymer. Preferably the amount of siloxy-containing compound may be sufficient to provide a covalently cross-linked siloxanyl polymer having the appropriate concentration of hydroxyl groups to obtain the desired properties in the polymeric composition while requiring a low concentration of boron. For example, sufficient to provide a cross-linked polymer cluster having a concentration of hydroxyl moieties as herein defined.

An indication of when the level of covalent cross-linking between the siloxanyl polymer and the siloxy-containing compound is approaching a stage which is useful for further processing via boron cross-linking may be indicated by a steep increase in the viscosity. For example, the viscosity may increase from a value of below or around 1 Pas to values at least a factor of 5, for example a factor of 10 higher.

Preferably, the ratio of siloxy-containing compound to siloxanyl polymer may correspond to a molar ratio of siloxy-containing compound:siloxanyl polymer in the range of 0.7:1 to 1.30:1, preferably 0.8:1 to 1.2:1, such as 0.9:1 to 1.1:1. Ratios of approximately 1:1 are especially preferred.

Preferably the molar ratio of siloxy-containing compound:siloxanyl polymer may correspond to a theoretical excess of cross-linking functional groups on the siloxy-containing compound of around 50% in comparison with the cross-linking groups on the siloxanyl polymer, e.g. hydroxyl groups. For example, there may be an excess of around 30-70%, preferably around 40-60%.

Boron Compounds

The boron compound must be capable of forming dynamic cross-links, as defined herein, with the covalently cross-linked siloxanyl polymer.

Preferably the boron compound is selected from triethyl borate, diboron trioxide, tetraboron disodium heptaoxide, disodium tetraborate and boric acid.

The concentration of boron within the polymeric compositions of the invention is in the range 0.005-0.160 wt. %, by weight of the total composition. Preferably the boron concentration is less than 0.12 wt. %, preferably less than 0.03 wt. %, more preferably less than 0.017 wt. %. Typical ranges of boron content would be, for example, in the range 0.007-0.11 wt. %, preferably 0.010-0.016 wt. %.

Polymeric Composition

The polymeric compositions of the invention preferably have a Shore hardness as measured using a Shore 00 durometer according to ISO-868 in the range of 20 to 80.

The viscosity of the polymeric compositions typically may be higher than that of the siloxanyl polymer, siloxy-containing compound and boron-containing compound used in its production. For example, the final viscosity of the polymeric composition may be in the range 30-2000 Pas at 20° C. (30000-2000000 cP). Typical polymeric compositions according to the invention have similar viscosity at 20° C. to BASF Oppanol® B10N.

The polymeric compositions of the invention may in themselves be suitable for use as bouncing putties, silly putties and/or bounce clays, i.e. without addition of a particulate or granular material, or other additives. Typically the compositions of the invention may have a bounce height of at least 20 cm, preferably at least 35 cm, more preferably at least 50 cm, when a 0.4 g ball formed thereof is dropped from a height of 2 m onto a flat glass surface.

Composite Materials

The present invention provides a composite material comprising the polymeric composition as herein defined.

Preferably the composite material comprises at least 2 vol. % of the polymeric composition of the invention, for example 2-99 vol. %.

Preferably the composite material further comprises at least 1 vol. % of a particulate or granular material, for example 1-98 vol. % of a particulate or granular material.

In one embodiment, applicable to all aspects of the invention, the composite material may comprise at least 80 vol. % of the particulate or granular material, for example 80-98 vol. %, preferably 88-95 vol. %.

In a further embodiment, equally applicable to all aspects of the invention, the composite material may comprise less than 80 vol. % of the particulate or granular material, preferably less than 75 vol. %, more preferably less than 50 vol. %. For example 1-74 vol. %, preferably 5-49 vol. %, for example 10-40 vol. %.

Preferably, in all embodiments, the particulate or granular material has an average particle size in the range of 0.02-0.5 mm, 0.05-0.35, more preferably 0.075-0.35 mm, for example 0.10-0.15 mm.

It is preferred that the particulate or granular material is selected from the group consisting of borosilicate glass beads, sand, ground marble, polymer grains or balls, cenospheres, microspheres of plastic ceramics or glass, or mixtures of these materials.

The particles contained in the preferred embodiment consist of natural sand, which is sold under the designation GA39. Another suitable particle is K37 from 3M, a hollow spherical glass bead produced synthetically. Another usable particle is SL 150, which consists of so-called cenospheres which are produced together with flying ash in the combustion of coal. They are white or grey in colour and are hollow.

Yet a further particulate material which has been used in practical trials is Mikroperl AF, which consists of completely round, solid glass spheres. A preferred size is 75 to 150 µm. They are transparent, which can be utilised for achieving interesting and attractive aesthetic effects in the finished material composition. The polymeric compositions of the invention display extremely good adhesion to such particles, for which reason no surface modification or primer is needed.

In testing of different types of particles, it has been observed that completely round particles increase the doughy property of the composition, which implies that the polymeric composition may be made drier and the need for a plasticizer may be reduced.

Particles that create purely aesthetic effects, such as mica particles, may be added. Surface modification may be needed in order for the polymeric composition to adhere to these.

When the particulate or granular material forms the majority of the composite material by volume, the polymeric composition of the invention acts as a binder, coating the particles or grains so that these adhere to each other, but in many places leave small air pockets between. These air pockets may be defined as "voids" and where the vol. % of filler is greater than 74 vol. % this may include the combined volume of voids and particulate or granular material.

In embodiments where the polymeric composition of the invention is acting as a binder, e.g. where the particulate or granular material forms more than 50 vol. % of the composite material, it may form the above-mentioned layers on the particles or grains with a layer thickness that lies in the order of magnitude of 0.1 to 10 µm, preferably 0.5 to 5 µm and even more preferably 1 to 2 µm. This layer thickness is sufficient to permit an adhering between the particles or grains, but still not so great that the interstices between the coated particles or grains run the risk of being completely filled out by the polymeric composition so that the granular structure of the composite material is lost. When the particles or grains have finally been covered by the polymeric composition, it should, as was mentioned above, have such chemical or physical properties that it remains on the particles or grains to a high degree. Surface treatment or modification of the particles or grains may be used to improve the adhesion of the polymeric compositions and the surface of the particles or grains.

Another important property in the polymeric composition is that of low tackiness i.e. low adhesion to the surroundings, with the exception of the particles or grains. By such means, binder residues will not remain either on hands, clothes, moulds, work surfaces or the like when the composite material is handled. In order for the composite material to maintain its integrity and not be too crumbly, it is important that the polymeric composition displays a good level of internal adhesion, and is sufficiently soft and pliable so that it maintains it cohesion as an easily handled, non-littering whole.

The composite material preferably shows low adhesion to most other surfaces that may occur in its surroundings, with the exception of silicone and silicone rubber.

Preferably the composite material does not adhere to and smear on, for example, tables and hands when being used. Internal adhesion of the composite material is good, which contributes in its internal integrity and its non-crumbling property. The particulate structure of the composite material makes it pleasant to handle.

Additives

Various additives may also optionally be added to the polymeric composition or composite material of the invention in order to improve or vary its properties in some respect.

A plasticizer acts as a lubricant between the polymer chains included in the polymeric composition, and imparts to the composition or to the composite material a doughier consistency. Suitable plasticizers include, for example, stearic acid and oleic acid.

Use may advantageously be made, of tack-reducing agents such as Vaseline, which is a highly viscous paraffin oil in the semi-solid phase. Glycols such as polyglycols may also be employed for this purpose.

Various pigments may be added in order to modify the colour of the composite material.

In all embodiments, the polymeric composition or composite material of the invention may further comprise at least one additive, preferably selected from the group consisting of softeners, tack-reducers, plasticizers, lubricants, pigments and colorants.

Additives such as polyglycols, for example, ethoxylated fatty acid esters, or oleic acid may also be added. Suitable additives include esters of monoglycerides, such as acetic acid esters of monoglycerides such as that sold as "Soft & Safe". Alcohols such as octyldodecanol and Isofol20 are also suitable additives. Stearic acid may also be added.

Preferably such additives may be present in total at a maximum of 10 wt. % by weight of the polymeric composition or by weight of the composite material.

Bouncing Putty or Silly Putty

The polymer compositions and composite materials of the invention are preferably suitable for use as a bouncing putty or silly putty, either alone or in combination with suitable additives as set out above. Puttys are familiar to those of skill in the art. In this context, a putty means a fluid composition which exhibits viscous properties over long timescales but may show elastic properties over short timescales. Compositions of the invention are viscous at longer time scales (seconds to minutes, e.g. over periods of greater than 1 second, such as over 1 second to 10 minutes or greater) and can be reformed into different shapes. Generally compositions of the invention are elastic under shorter time scales (particularly over periods of less than 1 second, particularly over periods of less than 0.1 seconds (e.g. less than 0.02 seconds such as 0.02 to 0.0001 seconds). Typically, compositions of the invention will bounce and retain their shape when dropped on a hard surface, but will deform under longer time scales. Puttys, such as the compositions of the invention have the property that they do not have a permanent equilibrium shape, and will not return to their original shape if deformed.

As a general indication, in an oscillatory shear experiment when the elastic modulus (G') exceeds the viscous modulus (G") this corresponds to a transition from viscous to elastic behaviour. Puttys of the invention will exhibit viscous behaviour at low shear rates. In a preferred embodiment, puttys of the invention exhibit viscous behaviour at low oscillatory shear rates, i.e. G">G' at low shear rates, such as below 1 s$^{-1}$ orbelow 0.5 s$^{-1}$.

G', G" and complex viscosity are measured with the rheometer in the oscillatory shear mode. Shear viscosity is measured as a function of the shear rate with the rheometer in the continuous shear mode.

The viscosity of the final putty should preferably be above 10$^2$ Pas, such as above 10$^3$ Pas. Polymeric compositions and Puttys may have a viscosity below 10$^8$ or 10$^6$ Pas, preferably below 10$^5$ Pas when measured at a shear rate of 0.015-2 s$^{-1}$ under continuous shear mode. Preferred ranges are 10$^2$-10$^6$ Pas and especially 10$^3$-10$^5$ Pas when measured at a shear rate of 0.015-2 s$^{-1}$.

Typically, for polymeric compositions and putties (as well as in all appropriate embodiments) of the invention the crossover point to elastic behaviour, i.e. where G'>G" will occur with an oscillatory shear rate in the range of 1 and 20 Hz, preferably between 1 and 10 Hz. Thus in one embodiment the compositions (and other embodiments such as putties) of the invention will show elastic behaviour (G'>G") at shear rates above 1 s$^{-1}$, especially above 2 s$^{-1}$ and particularly above 10 s$^{-1}$ (e.g. at 2 to 10,000 s$^{-1}$). Correspondingly in one embodiment the compositions (and other embodiments such as putties) of the invention will show viscous behaviour (G">G') at shear rates below 1 s$^1$, especially below 0.5 s$^{-1}$ and particularly below 0.2 s$^{-1}$ (e.g. at 0.2 to 0.0001 s$^{-1}$). All viscosity and shear parameters relate to measurements at 20-25° C. (e.g. 23° C.) unless otherwise stated.

Processes

Processes for the manufacture of polymeric compositions according to the present invention are further provided.

In one aspect, a process for the manufacture of a polymeric composition or composite material is provided, said process comprising the steps of:
 (i) reacting at least one siloxanyl polymer with a siloxy-containing cross-linking agent to form covalent cross-links;
 (ii) reacting the covalently cross-linked polymer with a boron compound;
and optionally
 (iii) adding a particulate material.

In another aspect, a process for the manufacture of a composite material is provided, said process comprising the steps of:
 (i) reacting at least one siloxanyl polymer with a siloxy-containing cross-linking agent to form covalent cross-links;
 (ii) adding a borosilicate particulate material; and
 (iii) adjusting the pH of the mixture.

In all aspects of the invention it is preferred that step (i) is a condensation reaction terminated before all hydroxyl moieties are consumed.

The invention is not limited to structures obtained by using linear PDMS molecules terminated with hydroxyl groups as starting material. Any siloxanyl-based polymers characterized by having hydroxyl-functionality, which at least partly are accessible for cross-linking via a boron containing substance, would be functional as starting materials to produce the compositions of the invention. Alternatively or in addition the functional groups can also be hydrolysable groups that are hydrolyzed just before cross-linking via a boron containing substance.

Reaction of the siloxanyl polymer and siloxy-containing compound in step (i) may typically be achieved by mixing at a temperature in the range of 20-200° C., for example, 20-150° C., for example around 130° C. More preferably the temperature is in the range 20-100° C., for example 60-90° C.

Step (i) typically may have a reaction duration in the range of 5 minutes to 5 hours, preferably approximately 15-90 minutes, for example 30-60 minutes.

The ratio of siloxy-containing cross-linking agent to siloxanyl polymer in step (i) preferably may correspond to a molar ratio of siloxy-containing cross-linking agent:siloxanyl polymer in the range 0.7:1 to 1.30:1, preferably 0.8:1 to 1.2:1, such as 0.9:1 to 1.1:1, especially approximately 1:1

In a preferred embodiment, applicable to all aspects of the invention, said siloxy-containing cross-linking agent is trifunctional and/or said siloxyanyl polymer is OH-endcapped.

Preferably said siloxanyl polymer prior to step (i) comprises on average more than one hydroxyl moiety per molecule, preferably at least two. Alternatively or in addition, said siloxanyl polymer may comprise at least one hydrolysable group per molecule.

Hydrolysable groups, when present, may be hydrolysed after step (i) to provide additional hydroxyl moieties to serve as cross-linking points for step (ii). Preferably said hydrolysis may be under acid-hydrolysis conditions.

Suitable hydrolysable groups may be selected from amide groups and ester groups.

Typically the reaction between the covalently cross-linked siloxanyl polymer cluster formed in step (i) and boron compound in step (ii) is conducted at a temperature in the range 5-200° C., preferably 10-150° C., more preferably in the range 20-80° C., for example 50° C.

Preferably step (ii) has a reaction duration in the range of 5 seconds to 1 hour, preferably approximately 30 seconds to 10 minutes, for example 1-5 minutes.

Typically the boron compound may be added in the form of a saturated aqueous solution. A suitable concentration may be in the range of 1-10 wt. %, for example around 5-6 wt. % e.g. 5.4 wt. %. Cross-linking via boron may be achieved by mixing e.g. by continuous stirring. For example, an aqueous solution of boric acid may be used.

An increased temperature in step (ii) may advantageously speed up the reaction due to an increase in the rate at which water is evaporated.

In one embodiment, applicable to all aspects of the invention, cross-linking via hydroxyl-groups on covalently cross-linked siloxanyl polymers such as PDMS, for example terminating groups on linear polymers, functional side-groups on linear or branched polymers, or functional groups on a covalently-bound polymer network, or other related arrangements, may be achieved without direct addition of a boron-containing chemical, such as boric acid.

In this embodiment, dynamic cross-links may be initiated by activating borosilicate based glass beads by adjusting pH of the material. Preferably the pH is adjusted to below 8, for example below 7.5.

This enables a convenient manufacturing process and easy scaling-up of production since mixing can be done in the low viscosity state. After mixing, dynamic cross-links, and an increase in viscosity, may be triggered in the late production stages by pH adjustment. In addition, this cross-linking reaction is rapid and there is no need for excessive heating for extended time periods. Instead a high viscosity material with elastic properties is obtained after simple evaporation of water residues from the acid used for pH adjustment.

Suitable acids for pH adjustment include carboxylic acids, such as oxalic acid, and HCl. Preferably HCl may be used.

The acids may be added as an aqueous solution to the dry material, which may optionally be kneaded.

Typically the pH adjustment initiating reaction between the covalently cross-linked siloxanyl polymer cluster formed in step (i) and the borosilicate material is conducted at close to room temperature, for example a temperature in the range 5-90° C., preferably 10-80° C., more preferably in the range 20-70° C., for example around 50° C.

Preferably the boron cross-linking step has a reaction duration in the range of 5 seconds to 1 hour, preferably approximately 30 seconds to 10 minutes, for example 1-5 minutes.

The processes of the invention provide polymeric compositions and/or composite materials as discussed above. Preferably the product formed has a boron concentration in the range 0.005-0.160 wt. %.

The invention further provides a polymeric composition or composite material obtainable by the processes of the invention.

PREFERRED EMBODIMENTS

The preferred embodiments described herein are applicable to all aspects of the invention.

Typically in a first step (step (i)) PDMS molecules characterized by containing an average of more than one hydroxyl-group per molecule, are reacted with a siloxy-containing cross-linking agent to form covalent cross-links. The siloxy-containing cross-linking agent is characterized by not containing boron in any form, and by forming cross-links that are not dynamic in character, i.e. that are covalent.

The material then goes through a second stage (step (ii)), characterized by forming the dynamic cross-links that are important in order to obtain a product with properties of a silly putty. The dynamic cross-links are the result of cross-linking between hydroxyl moieties attached to various siloxane-based molecular arrangements and boron compounds, as has been outlined above.

The step (i) covalent cross-linking reduces the amount of boron compound needed to achieve sufficient dynamic cross-linking to obtain the required properties. Thus in this way new materials are provided, which fulfill the new European regulations and yet have properties of a silly putty.

The properties of the final material may be influenced by the characteristics of the siloxy-containing polymer that is used as starting material. For example, a short chain hydroxyl-terminated PDMS, or a PDMS with a high hydroxyl-content relative to dimethylsiloxane content, may result in a relatively hard and cohesive or sometimes crumbly final product. A long chain hydroxyl-terminated PDMS, or a PDMS with a low hydroxyl-content relative to dimethylsiloxane content, may result in a relatively soft and sometimes tacky final product. The ability to manipulate the chain-length may be useful in obtaining certain properties in the product.

For example, WACKER® POLYMER CDS 100 (molecular weight of about 4000 Dalton and viscosity ca. 100 cP, as given by the manufacturer Wacker Chemie AG) and WACKER® POLYMER C 2 T (molecular weight of about 25000 Dalton and viscosity ca. 2000 cP, as given by the manufacturer Wacker Chemie AG), may be compared in Example 1 and Example 2. Mixtures of long-chain and short-chain PDMS may be advantageous.

Various siloxy-containing compounds that give covalent cross-linking can be used. A preferred combination of PDMS and cross-linking agent is characterized by having the capability of forming (partial) networks or branched structures with hydroxyl functionality, as opposed to combinations that may only form linear PDMS structures with hydroxyl terminations. For example, the siloxy-containing compound functioning as cross-linking agent may form two more, for example three or more covalent bonds to PDMS.

Cross-linking agents can be exemplified by siloxy-containing low molecular weight compounds (alkoxysilanes such as; triacetoxy methylsilane; triactetoxy ethylsilane, or tetraethyl silicate), or by siloxy-containing compounds with higher molecular weights (such as a PDMS with alkoxy functional groups).

In the examples herein, a triacetoxy ethylsilane, supplied by Wacker Chemie AG under the trade name WACKER® CROSS-LINKER ES 23 has been used as the siloxy-containing cross-linking agent. The cross-linker is trifunctional and reacts with the hydroxyl groups of the hydroxyl-terminated PDMS in a condensation reaction releasing acetic acid.

An amount of about 1 wt. % ES 23 may be suitable to cross-link WACKER® POLYMER C 2 T in order to obtain a net-work for further processing. A lower amount of ES 23 may give a net-work with too high a concentration of hydroxyl groups, which consumes too much boric acid to obtain a product with the desired properties, while a higher amount of ES 23 may give too stiff a covalent-network to be useful. See Example 4.

An indication of when the conversion is approaching a stage which is useful for further processing is indicated by a steep increase in the viscosity.

For C 2 T the experimentally found weight ratio converts to a molar ratio of about 1:1 for the siloxy-containing compound and the siloxanyl polymer (ES 23:C 2T), which corresponds to a theoretical excess of about 50% of the ES 23 functional groups to PDMS hydroxyl groups.

In the same way appropriate amounts of ES 23 to WACKER® POLYMER CDS100, WACKER® POLYMER CDS750 (viscosity ca. 750 cP), and WACKER® POLYMER C 1 T (viscosity ca. 750 cP) corresponds to 3.9 wt. %, 1.5 wt. %, and 1.1 wt. %.

Instead of using a boron-containing compound, for example, boric acid for the final cross-linking reaction in which the dynamic cross-links are obtained, borosilicate glass microspheres may be used. In many applications microspheres are added as filler anyway.

This may enable the formation of cross-links via hydroxyl-groups belonging to PDMS based structures, such as: terminating groups on linear PDMS; functional side-groups on linear or branched PDMS; or functional groups on a covalently bound PDMS network; or other related arrangements, without any addition of a boron-containing compound per se.

In such systems cross-linking may be achieved by adjusting pH of the material. Since the associated increase in viscosity of the polymeric composition may now be controlled and delayed to a later production stages, this allows greater control and convenience in the production process and easy scaling up of manufacturing.

Another advantage is that the cross-linking now stems from positions within the polymeric composition and from the surfaces of the borosilicate based microspheres. Thus no particular care has to be taken to evenly distribute the cross-linking agent throughout the polymeric composition, since it is already perfectly distributed via the mixing of the microspheres (acting as filler) and the covalently cross-linked siloxanyl polymer, which may have relatively low viscosity before pH adjustment and formation of dynamic cross-links See Example 5.

When added in small amounts, the particulate material acts as filler. However the examples cover a range up to and including the particulate material forming the majority component by volume. Thus the polymeric composition acts as a binder which covers the particles with an individual thin layer thereof.

To obtain a final product with properties expected from a bouncing putty, and with a boric acid content that is below the levels stipulated by the European Chemicals Agency (ECHA) candidate list a certain amount of WACKER® POLYMER CDS 100, WACKER® POLYMER C 2 T, softener, and fillers may be added to the formula. It was also found that it sometimes may be useful to mix different preparations of covalently cross-linked networks. See Example 6.

Other additives such as fillers, softeners, and chemicals reducing the tackiness of the product can optionally be added to obtain the final material with the desired properties. In particular the properties for the presently invented putty improve by adding polyglycols, such as ethoxylated fatty acid esters. See Example 7.

The invention is further demonstrated and described in the following non-limiting examples and the attached Figures, in which.

EXAMPLES

Example 1

Figure 1:
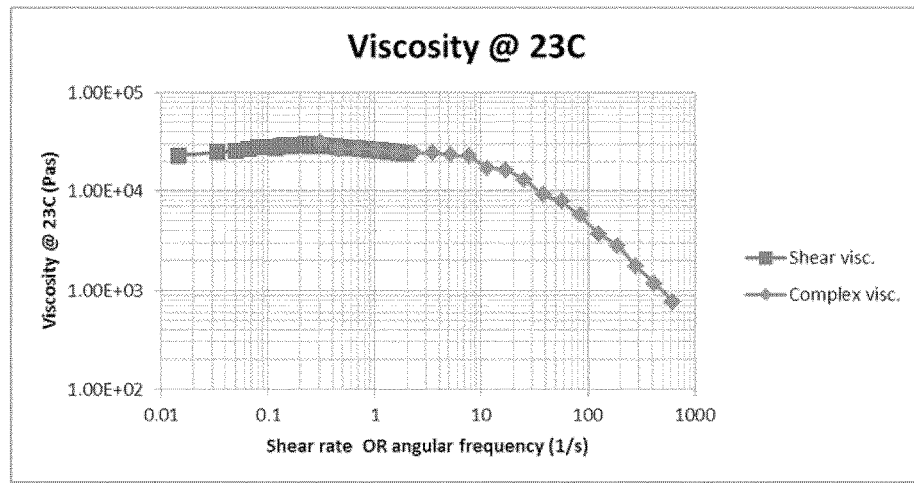
FIG. 1 shows the viscosity of a silly putty at varying shear rates at 23 C.

Reduction of the amount of boron containing compound results in loss of desired properties well before the content of boron containing substance is below the levels stipulated by the European Union. A series of bouncing putties in which the boric acid content was varied was prepared in the following way: A saturated aqueous solution of boric acid was prepared, which at 25° C. has a concentration corresponding to 5.4% wt. The saturated boric acid solution was mixed with a hydroxyl-terminated polydimethylsiloxane; WACKER® POLYMER CDS 100 (molecular weight of about 4000 Dalton and viscosity ca. 100 cP, as given by the manufacturer Wacker Chemie AG). Water was evaporated during continuous stirring of the mixture and the properties of the final mixture were evaluated. The bouncing property was evaluated by dropping a ball (0.4 g) from a height of 2 m onto a flat glass surface. Table 1 shows that loss of properties was observed below a molar ratio of 1:1 (boric acid:PDMS) corresponding to 1.6 wt %. It is clear that desired properties are lost well before content of the boric acid is sufficiently low.

TABLE 1

| WACKER ® POLYMER CDS 100 (g) | Binder (% vol) | Filler (% vol) | Voids (% vol) | Saturated boric acid solution (g) | Molar ratio boric acid:CDS 100 | Boric acid (% wt) | Boron (% wt) | Observation | Bounce from 2 m (cm) |
|---|---|---|---|---|---|---|---|---|---|
| 1 | 100 | 0 | 0 | 0.15 | 0.5:1 | 0.80 | 0.14 | Thin solution, no noticeable increase in viscosity | None |
| 1 | 100 | 0 | 0 | 0.22 | 0.75:1 | 1.2 | 0.21 | Slight viscosity increase - viscosity like syrup | None |
| 1 | 100 | 0 | 0 | 0.29 | 1:1 | 1.6 | 0.28 | Strongly increased viscosity as compared to previous sample, but flows under gravity | 78 |
| 1 | 100 | 0 | 0 | 0.44 | 1.5:1 | 2.3 | 0.40 | Somewhat increased viscosity as compared to previous sample, but flows under gravity | 80 |

Example 2

An increase in molecular weight of the polydimethylsiloxane (PDMS) chain used as starting material results in a loss of the desired properties before the content of boron containing substance is sufficiently low. A series of bouncing putties, prepared as described in Example 1, with WACKER® POLYMER C 2 T (molecular weight of about 25000 Dalton and viscosity ca. 2000 cP, as given by the manufacturer Wacker Chemie AG) shows that essential properties are lost already at a molecular weight at and above 25000 since none of the samples in Table 2 has desired properties. Yet the concentration of boric acid is above the levels stipulated by the European Union.

TABLE 2

| WACKER ® POLYMER C 2 T (g) | Binder (% vol) | Filler (% vol) | Voids (% vol) | Saturated boric acid solution (g) | Molar ratio boric acid:C 2 T | Boric acid (% wt) | Boron (% wt) | Observation | Bounce from 2 m (cm) |
|---|---|---|---|---|---|---|---|---|---|
| 1 | 100 | 0 | 0 | 0.023 | 0.5:1 | 0.12 | 0.021 | No noticeable increase in viscosity | None |
| 1 | 100 | 0 | 0 | 0.034 | 0.75:1 | 0.18 | 0.031 | Minor viscosity increase - soft texture, but still too liquid | None |
| 1 | 100 | 0 | 0 | 0.046 | 1:1 | 0.25 | 0.044 | Somewhat thicker as compared to previous sample, but still too liquid | None |
| 1 | 100 | 0 | 0 | 0.069 | 1.5:1 | 0.37 | 0.065 | Thicker as compared to previous sample, but still too liquid | None |
| 1 | 100 | 0 | 0 | 0.0923 | 2:1 | 0.49 | 0.086 | No notable difference as compared to previous sample | None |

Example 3

Addition of inactive filler material results in loss of the desired properties before the content of boron containing substance is sufficiently low. A series of bouncing putties with increased filler content shows a loss of properties at filler contents above 40% wt. All samples were based on WACKER® POLYMER CDS 100 with a molar ratio of 1:1 (boric acid: CDS 100), and as filler was used hydrophilic amorphous pyrogenic silica; WACKER® HDK® N20. The putties were prepared as described in Example 1, and filler was added by kneading. Sometimes a small amount of ethanol was used as processing liquid, which was evaporated in the late stages. By preparing samples both with, as well as without ethanol it was verified that properties of the putty was not affected by the use of the processing solvent. Table 3 shows loss of properties well before content of the boric acid is sufficiently low.

TABLE 3

| Bouncing putty (g) | WACKER® HDK® N20 (g) | Binder (% wt) | Filler (% wt) | Boric acid (% wt) | Boron (% wt) | Observation | Bounce from 2 m (cm) |
|---|---|---|---|---|---|---|---|
| — | — | 100 | 0 | 1.6 | 0.28 | Stretchable, elastic and flows under gravity. | 78 |
| 3.5 | 0.5 | 87.5 | 12.5 | 1.4 | 0.24 | Resembling previous sample, but has less flow under gravity. | 102 |
| 1.75 | 0.46 | 79.2 | 20.8 | 1.32 | 0.23 | Does not appear to flow under gravity. | 100 |
| 0.348 | 0.154 | 69.3 | 30.7 | 1.22 | 0.21 | Hard and difficult to reshape. Does not flow under gravity. | 66 |
| 0.322 | 0.178 | 64.4 | 35.6 | 1.18 | 0.21 | Hard and difficult to reshape. Does not flow under gravity. | 50 |
| 1.19 | 0.81 | 59.4 | 40.6 | 1.14 | 0.20 | Crumbly and too low cohesion. It is not possible to obtain a homogeneous mixture. | — |

Example 4

A steeply increasing viscosity during the final stages of cross-linking hydroxyterminated PDMS with WACKER® CROSS-LINKER ES 23 is an indication of a desired cross-linking density for further processing. For WACKER® POLYMER C 2 T this is obtained at an amount of about 0.9% wt ES 23. A lower amount of ES 23 gives a net-work with a (too) high concentration of hydroxyl groups which consumes a too high amount of boric acid to obtain a product with the desired properties, while a higher amount of ES 23 gives a (too) stiff and less flexible matrix to be useful, see Table 4. In the same way appropriate amounts of ES 23 to WACKER® POLYMER CDS100, WACKER® POLYMER CDS750, and WACKER® POLYMER C 1 T corresponds to 3.9% wt, 1.5% wt, and 1.1% wt.

TABLE 4

| WACKER® POLYMER C 2 T (g) | WACKER® CROSSLINKER ES 23 (g) | ES 23 (% wt) | Molar ratio ES 23:C 2 T | Observed properties about 15 h after mixing. Samples were kept at room temperature during mixing and during the reaction period. |
|---|---|---|---|---|
| 20 | 0.10 | 0.50 | 0.53:1 | Viscosity somewhat increased. |
| 20 | 0.15 | 0.74 | 0.80:1 | Viscosity increased as compared to previous sample. Threads appear when separating fingers between which sample has been applied. |
| 20 | 0.20 | 0.99 | 1.07:1 | Higher viscosity and harder. More threads appear as compared to previous sample. |
| 20 | 0.25 | 1.23 | 1.34:1 | Sample too stiff to be practically useful. |
| 20 | 0.30 | 1.48 | 1.60:1 | Hard and not useable. |
| 20 | 0.18 | 0.90 | 0.96:1 | The best sample in the series. |

Example 5

Dynamic cross-links and a final product with properties desired from a bouncing putty can be obtained without adding boric acid, but instead by using a filler of microspheres from borosilicate glass (3M™ Glass Bubbles K37) to form the dynamic cross-links. In a first stage the binder is conveniently mixed with the filler in a low viscous solution, after which the pH is lowered by adding hydrochloric acid. Addition of HCl activates dynamic cross-linking, viscosity of the binder/material increases strongly and the final properties of the bouncing putty are achieved. From the three samples with 0.38 g K37 per gram CDS 100 it can be seen that at a certain amount acid added there is no further gain in properties, and ca. 8% wt of HCl (30%) based on weight of K37 was used as a standard addition. From the table can be concluded that K37 can replace addition of boric acid, and furthermore gives a convenient route for processing.

TABLE 5

| WACKER® POLYMER CDS 100 (g) | 3M™ Glass Bubbles K37 (g) | Apparent content boric acid (% wt)*) | Apparent content boron (% wt)*) | Binder (% vol)#) | Filler (% vol)#) | Voids (% vol)#) | HCl (30%) (g) | Observation | Bounce from 2 m (cm) |
|---|---|---|---|---|---|---|---|---|---|
| 1.0 | 0.26 | 0.64 (0.80) | 0.11 (0.14) | 58.7 | 41.3 | 0 | 0.02 | Thin solution, minor viscosity increase. | None |

TABLE 5-continued

| WACKER® POLYMER CDS 100 (g) | 3M™ Glass Bubbles K37 (g) | Apparent content boric acid (% wt)[*] | Apparent content boron (% wt)[*] | Binder (% vol)[#] | Filler (% vol)[#] | Voids (% vol)[#] | HCl (30%) (g) | Observation | Bounce from 2 m (cm) |
|---|---|---|---|---|---|---|---|---|---|
| 1.0 | 0.38 | 0.85 (1.2) | 0.15 (0.21) | 49.3 | 50.7 | 0 | 0.005 | Thin solution, minor viscosity increase. | None |
| 1.0 | 0.38 | 0.85 (1.2) | 0.15 (0.21) | 49.3 | 50.7 | 0 | 0.03 | Strongly increased viscosity as compared to previous sample, but flows under gravity. | 90 |
| 1.0 | 0.38 | 0.85 (1.2) | 0.15 (0.21) | 49.3 | 50.7 | 0 | 0.06 | Similar to previous sample and flows under gravity. | 78 |
| 1.0 | 0.51 | 1.0 (1.6) | 0.17 (0.28) | 42.0 | 58.0 | 0 | 0.04 | Increased viscosity as compared to previous sample, flows slowly under gravity. | 110 |
| 1.0 | 0.77 | 1.3 (2.3) | 0.23 (0.40) | 32.5 | 67.5 | 0 | 0.06 | Increased viscosity as compared to previous sample, appears not to flow under gravity. | 104 |
| 1.0 | 1.00 | 1.5 (3.0) | 0.26 (0.52) | 27.0 | 73.0 | 0 | 0.08 | Hard and does not flow under gravity. | 88 |
| 1.0 | 1.42 | 1.8 (4.2) | 0.31 (0.73) | 19.3 | 74.0 | 6.7 | 0.11 | Similar to previous sample. Hard and does not flow under gravity. | 65 |
| 1.0 | 4.0 | 2.5 (11) | 0.44 (1.92) | 6.8 | 74.0 | 19.2 | 0.32 | Too hard and crumbly, but adding 0.1 g stearic acid as softener gives a material with dough-like properties. | 30 |

[*] By observing that the sample containing 0.51 g K37 and 1 g CDS 100 has properties similar to the sample in Table 1 with a molar ratio 1:1 (boric acid:CDS 100), 1 g of K37 appears to replace 0.5 mmol boric acid. Number within bracket relates to boric acid concentration with the calculation based on weight of binder and omitting the weight of filler.
[#] Estimated by in the calculation using a density of K37 of 0.37 g/mL, and assuming that space filled by K37 has a volume fraction of 0.74 in close packing.

Example 6

To obtain a final product with properties expected from a bouncing putty, and with a boric acid content that is below the levels stipulated by the European Chemicals Agency (ECHA) candidate list a certain amount of WACKER® POLYMER CDS 100, and fillers were added to the formula. First five different partly covalently cross-linked networks were prepared using the method outlined above, Table 6. These were then used to prepare the putties in Table 7.

In Table 8 is given preparations with very high volume content particles. This is to show that the silicone-based binder can be disposed in a thin layer as a coating on the particles, or the grains, which is the majority component (by volume). The preparation has dough-like properties.

TABLE 6

| Mix | WACKER® POLYMER (g) | WACKER® CROSSLINKER ES 23 (g) | Molar ratio ES 23:POLYMER | Comments |
|---|---|---|---|---|
| A | C 2 T: 397 | 3.5 | 0.94:1 | Prepared during mixing at 130° C. |
| B | CDS100: 384.5 | 15.4 | 0.68:1 | Made in two steps during mixing at 130° C. First CDS100 was reacted with ES23, followed by adding C 2 T and reacting with ES23. |
|  | C 2 T: 192.3 | 1.71 | 0.95:1 |  |
| C | CDS100: 384.5 | 15.4 | 0.68:1 | Prepared during mixing at 130° C. |
| D | CDS750: 197 | 3.0 | 0.97:1 | Prepared during mixing at 130° C. |
| E | C 1 T: 197.8 | 2.2 | 0.95:1 | Prepared during mixing at 130° C. |

TABLE 7

| Mix (g) | Binder WACKER® POLYMER (g) | Filler 3M™ K37 (g) | Filler Solid glass spheres (53-106 microns), Boud minerals Ltd (g) | Saturated boric acid solution (g) | Binder (% vol)[#] | Filler (% vol)[#] | Voids (% vol)[#] | Softener Stearic acid (g) | Apparent content boric acid (% wt)[*] | Apparent content boron (% wt)[*] | Observation | Bounce from 2 m (cm) |
|---|---|---|---|---|---|---|---|---|---|---|---|---|
| A; 9 | CDS100; 0.7 | 0.5 | 4.5 | — | 75.9 | 24.1 | 0 | 0.10 | 0.10 | 0.017 | Tacky and too liquid. | None |

TABLE 7-continued

| | Binder | | Filler | | | | | | Apparent content | Apparent content | | Bounce |
| | | | Solid glass spheres (53-106 microns), | Saturated boric | | | | Softener | boric | boron | | from |
| Mix (g) | WACKER® POLYMER (g) | 3M™ K37 (g) | Boud minerals Ltd (g) | acid solution (g) | Binder (% vol)[#] | Filler (% vol)[#] | Voids (% vol)[#] | Stearic acid (g) | acid (% wt)[*] | (% wt)[*] | Observation | 2 m (cm) |
|---|---|---|---|---|---|---|---|---|---|---|---|---|
| B; 9 | CDS100; 0.7 | 0.5 | 4.5 | — | 75.9 | 24.1 | 0 | 0.10 | 0.10 | 0.017 | Short and rubbery when worked with. | 29 |
| A; 4.5 B; 4.5 | CDS100; 0.7 | 0.5 | 4.5 | — | 75.9 | 24.1 | 0 | 0.10 | 0.10 | 0.017 | Slightly too tacky and yet short in character. | 22 |
| C; 9 | CDS100; 0.7 | 0.5 | 4.5 | — | 75.9 | 24.1 | 0 | 0.10 | 0.10 | 0.017 | Stretchable, elastic and flows under gravity, but somewhat sticky | 42 |
| C; 9 | CDS100; 0.7 | 0.75 | 4.5 | — | 72.1 | 27.9 | 0 | 0.10 | 0.15 | 0.026 | Stretchable, elastic, less sticky | 52 |
| C; 9 | C 2 T; 1.5 | 0.5 | 4.5 | — | 77.3 | 22.7 | 0 | 0.10 | 0.10 | 0.017 | Ok properties, but lower bounce. | 35 |
| C; 9 | CDS100; 0.35 C 2 T; 0.75 | 0.5 | 4.5 | — | 76.6 | 23.4 | 0 | 0.10 | 0.10 | 0.017 | Ok properties, and better bounce. | 54 |
| A; 6 C; 3 | CDS100; 0.35 C 2 T; 0.75 | 0.5 | 4.5 | — | 76.6 | 23.4 | 0 | 0.10 | 0.10 | 0.017 | Ok properties, but lower bounce. | 35 |
| D; 4 | — | 0.14 | — | — | 91.4 | 8.6 | 0 | 0.03 | 0.10 | 0.017 | Ok properties | 70 |
| E; 4 | — | 0.14 | — | — | 91.4 | 8.6 | 0 | 0.03 | 0.10 | 0.017 | Ok properties | 60 |
| D; 4 | — | — | — | 0.075 | 100 | 0 | 0 | 0.03 | 0.10 (true) | 0.017 (true) | Ok properties | 50 |
| E; 4 | — | — | — | 0.075 | 100 | 0 | 0 | 0.03 | 0.10 (true) | 0.017 (true) | Ok properties | 50 |

[*] By observing that the sample containing 0.51 g K37 and 1 g CDS 100 has properties similar to the sample in Table 1 with a molar ratio 1:1 (boric acid:CDS 100), 1 g of K37 appears to replace 0.5 mmol boric acid. In the last two examples boric acid has been added via an aqueous solution saturated in boric acid (5.4% wt), and is therefore denoted "true" value.
[#] Estimated by in the calculation using a density of K37 of 0.37 g/mL, a density of 2.6 g/mL for glass spheres, and assuming that space filled by filler has a volume fraction of 0.74 in close packing.

TABLE 8

| | Binder | | Filler | | Softener | | | | | | Apparent content | Apparent content | |
| Mix (g) | WACKER® POLYMER (g) | 3M™ K37 (g) | Sibelco quartz sand (g) | Stearic acid (g) | Sasol Isofol 20 (g) | Danisco Soft-n-Safe (g) | Binder (% vol)[#] | Filler (% vol)[#] | Voids (% vol)[#] | boric acid (% wt)[*] | boron (% wt)[*] | Observation |
|---|---|---|---|---|---|---|---|---|---|---|---|---|
| A; 0.24 | CDS100; 0.56 | 0.64 | GA39 ($D_{50}$ = 91 microns); 8.4 | 0.10 | 0.005 | — | 11.9 | 74 | 14.1 | 0.20 | 0.034 | Dough-like properties |
| A; 0.02 | CDS100; 0.20 | 0.12 | M32 ($D_{50}$ = 260 microns); 9.6 | 0.03 | 0.01 | 0.02 | 4.1 | 74 | 21.9 | 0.04 | 0.006 | Cohesive sand-like material |

[#] Estimated by in the calculation using a density of K37 of 0.37 g/mL, a density of 2.6 g/mL for quartz sand, and assuming that space filled by filler has a volume fraction of 0.74 in close packing.

Example 7

The alcohol ethoxylate "C12-13 Pareth-12" supplied by Croda under the trade name BRIJ™ LT12-SO—(RB) was added in an amount corresponding to 1, 2, or 4 parts to 100 parts organosiloxane. Polyglycol can improve properties after extended kneading and use. Intermediate amounts gave a putty somewhat less tacky, yet retaining the bounce, as compared to a putty without polyglycol.

Figure 2:
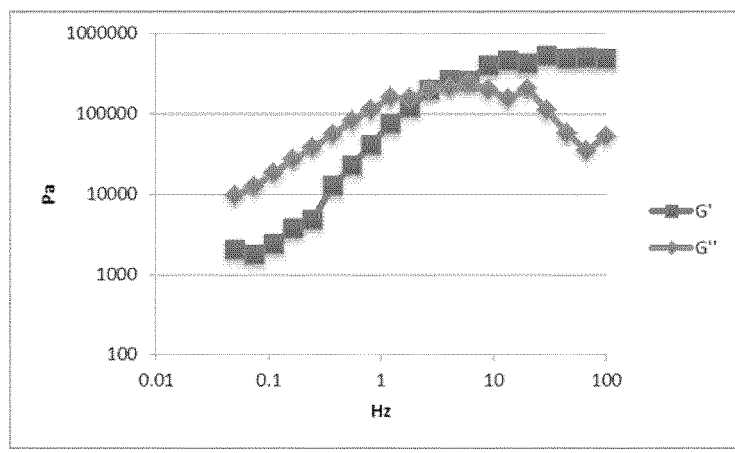
FIG. 2 shows the the elastic modulus (G') and the viscous modulus (G") of a silly putty at varying shear rates

Crazy Aaron's putty world) was investigated with a Bohlin CVO 100 Digital controlled-stress rheometer equipped with a 20 mm parallel plate. The gap was held constant at 250 micrometers. The results are shown in FIG. 1 and FIG. 2. The properties of this putty are representative of puttys of the invention.

In the continuous shear mode the investigated shear stress ranged up to above 44 kPa resulting in a shear rate of $2\ s^{-1}$. In this shear rate range ($0.015\ s^{-1}$ to $2\ s^{-1}$) the sample

TABLE 9

| | Binder | | Filler | | | | | | | |
|---|---|---|---|---|---|---|---|---|---|---|
| | | 3M™ | Solid glass spheres (53-106 microns), | Softener | Saturated boric acid | Apparent content boric acid | Apparent content boron | C12-13 | | Bounce |
| Mix | WACKER® POLYMER (g) | K37 (g) | Boud minerals Ltd (g) | Stearic acid (g) | solution (g) | (% wt)*) | (% wt)*) | Pareth-12 | Observation | from 2 m (cm) |
| A; 6 C; 3 | CDS100; 0.35 C 2 T; 0.75 | 0.5 | 4.5 | 0.1 | 0 | 0.10 | 0.017 | 0 | Ok properties. | 35 |
| A; 6 C; 3 | CDS100; 0.35 C 2 T; 0.75 | 0.5 | 4.5 | 0.1 | 0 | 0.10 | 0.017 | 0.10 | No major difference. Somewhat less tacky when kneaded | 30 |
| A; 6 C; 3 | CDS100; 0.35 C 2 T; 0.75 | 0.5 | 4.5 | 0.1 | 0 | 0.10 | 0.017 | 0.20 | As above | 30 |
| A; 6 C; 3 | CDS100; 0.35 C 2 T; 0.75 | 0.5 | 4.5 | 0.1 | 0 | 0.10 | 0.017 | 0.40 | Somewhat lower bounce | 20 |
| A; 6 C; 3 | CDS100; 0.35 C 2 T; 0.75 | 0 | 4.5 | 0.1 | 0.27 | 0.10 | 0.017 | 0 | Ok properties. | 60 |
| A; 6 C; 3 | CDS100; 0.35 C 2 T; 0.75 | 0 | 4.5 | 0.1 | 0.27 | 0.10 | 0.017 | 0.10 | No major difference. Somewhat less tacky when kneaded | 60 |
| A; 6 C; 3 | CDS100; 0.35 C 2 T; 0.75 | 0 | 4.5 | 0.1 | 0.27 | 0.10 | 0.017 | 0.20 | Somewhat lower bounce | 45 |
| A; 6 C; 3 | CDS100; 0.35 C 2 T; 0.75 | 0 | 4.5 | 0.1 | 0.27 | 0.10 | 0.017 | 0.40 | As above | 45 |

*)By observing that the sample containing 0.51 g K37 and 1 g CDS 100 has properties similar to the sample in Table 1 with a molar ratio 1:1 (boric acid:CDS 100), 1 g of K37 appears to replace 0.5 mmol boric acid.

Example 8

11.1 g Wacker CDS100 was mixed with 0.104 g Wacker Crosslinker V24 (Si—H oligo-siloxane) and 0.020 g Wacker Catalyzt OL (Pt-catalyst in PDMS). At heating hydrogen gas was released and the solution became thick like syrup. By adding boric acid via a saturated solution corresponding to a final concentration of 0.21 wt. % boron a cohesive and SillyPutty like material was obtained. Although being above the limits given by the new European legislation this is in contrast to the result obtained by adding the same amount boric acid to CDS100 by itself (compare Table 1 in Example 1) which gives a syrup-like texture. The observation was repeated by using another Si—H oligo-siloxane crosslinker (Wacker V88) and mixing 9.8 g CDS100 with 0.14 g V88 and 0.030 g Catalyzt OL.

Example 9

The rheological properties of a commercial sample of a Silly Putty ("Intelligente Knete" or "Thinking Putty" from behaved virtually Newtonian with a viscosity of about $1*10^4$ Pas to $1*10^5$ Pas. The data clearly shows that the sample flows with viscous properties dominating the elastic at these time scales. In the hands of a user this viscous property manifests it self by that the sample can be moulded and reformed to new shapes without returning to its original shape.

The viscosity behaviour at higher shear rates was obtained via the empirical Cox-Mertz rule and data of complex viscosity as a function of angular frequency is included in the figure. These data were obtained with the rheometer in the oscillatory shear mode and the frequency was swept from 0.05 Hz to 100 Hz. The viscosity decreases at higher angular frequencies with a cross over from Newtonian behaviour located in the range $1\ s^{-1}$ to $100\ s^{-1}$. The deviation from a Newtonian behaviour indicates that at shorter time scales (higher angular frequencies) the sample does not have time to relax to an equilibrium position.

Example 10

Figure 3:
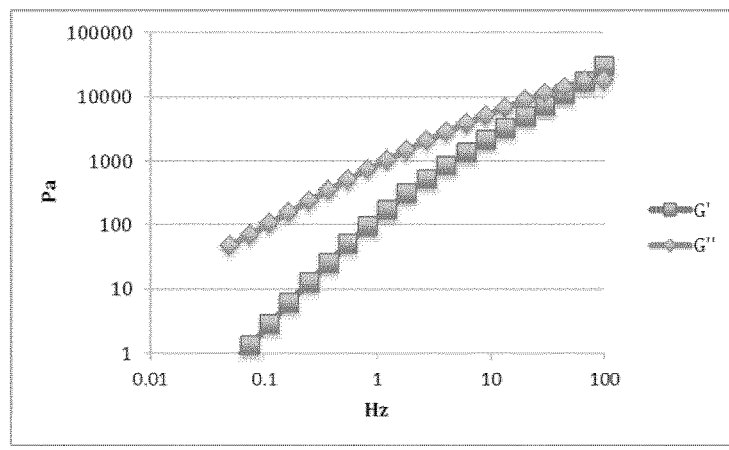
FIG. 3 shows the viscosity of a polymer cluster (prior to addition of boron) at varying shear rates.

The rheological properties of the sample in table 4 which was judged to have the most appropriate crosslinking density, with a molar ratio 0.96:1 of crosslinker ES 23 to polymer C 2 T, was investigated with a Bohlin CVO 100 Digital controlled-stress rheometer equipped with a 20 mm parallel plate. The gap was held constant at 250 micrometer. In an oscillatory shear experiment the viscous property is dominating and G" (the viscous modulus) exceeds G' (the elastic modulus) in virtually the whole frequency domain accessible with the present rheometer. The results are shown in FIG. 3.

Figure 4:
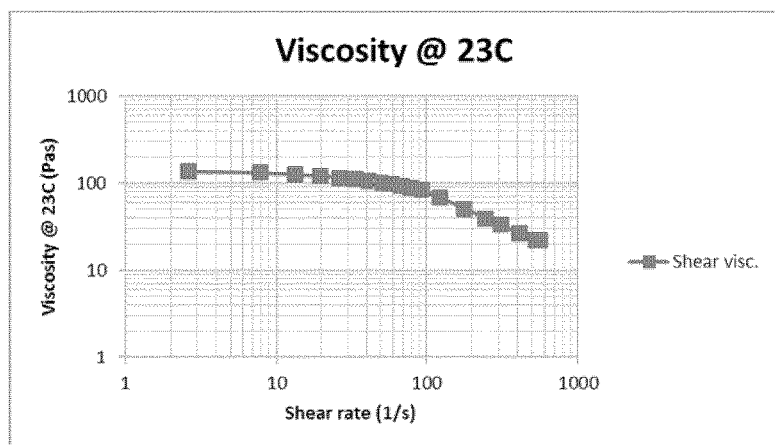
FIG. 4 shows the the elastic modulus (G') and the viscous modulus (G") of a polymer cluster (prior to addition of boron) at varying shear rates

With the rheometer in the continuous shear mode the viscosity at the Newtonian plateau is about 100 Pas. The results are shown in FIG. 4. This is much lower than in a final Silly Putty sample (see example 9) and demonstrates the influence of further (dynamic) cross-linking with a boron compound.

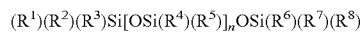

The invention claimed is:

1. A composite material comprising:
   at least 2 vol. % of a polymeric composition comprising at least one covalently cross-linked siloxanyl polymer cluster which is further cross-linked by a boron compound;
   and at least 1 vol. % of a particulate or granular material;
   wherein said composite material does not return to its original shape when deformed; and
   wherein the composite material has a boron concentration in the range 0.005-0.160 wt. %.

2. The composite material as claimed in claim 1 wherein said cluster, prior to further cross-linking with boron, comprises on average more than one hydroxyl moiety per cluster.

3. The composite material as claimed in claim 1 wherein the average molecular weight between branching points within said cluster ranges from 4-80 kD.

4. The composite material as claimed in claim 1 wherein said cluster, prior to further cross-linking with boron, comprises hydroxyl moieties at a concentration equivalent to 1-100 μmol [OH] per g of the cluster.

5. The composite material as claimed in claim 1 wherein said cluster, prior to further cross-linking with boron, comprises hydroxyl moieties at an average concentration corresponding to 10-1000 kD of polymer cluster per hydroxyl moiety.

6. The composite material as claimed in claim 1 wherein said cluster comprises at least one linear or branched siloxanyl polymer, wherein prior to cross-linking to form said cluster, said polymer comprises on average more than one hydroxyl moiety per molecule.

7. The composite material as claimed in claim 1 wherein said cluster comprises at least one siloxanyl polymer, wherein prior to cross-linking to form said cluster, said polymer comprises hydroxyl moieties at a concentration equivalent to 20-2000 μmol [OH] per g of the polymer and/or comprises hydroxyl moieties at an average concentration corresponding to 0.5-50 kD of polymer per hydroxyl moiety.

8. The composite material as claimed in claim 1 wherein said cluster comprises at least one siloxanyl polymer covalently cross-linked with at least one siloxy-containing compound.

9. The composite material as claimed in claim 6 wherein prior to covalent cross-linking said siloxanyl polymer has the structure:

$(R^1)(R^2)(R^3)Si[OSi(R^4)(R^5)]_nOSi(R^6)(R^7)(R^8)$ wherein n is an integer; and
wherein each of $R^1$-$R^8$ may be the same or different and is independently selected from the group consisting of hydrogen, methyl, ethyl, propyl, butyl, phenyl, vinyl and hydroxyl; and
wherein at least one of $R^1$-$R^8$ is hydroxyl.

10. The composite material as claimed in claim 9 wherein at least one of $R^1$, $R^2$, $R^3$, $R^6$, $R^7$ and $R^8$ is hydroxyl.

11. The composite material as claimed in claim 6 wherein said siloxanyl polymer is selected from the group consisting of polydiphenylsiloxane, polydibutylsiloxane, polydipropylsiloxane, polydiethylsiloxane, polydimethylsiloxane, and hydroxy-functionalised compounds thereof.

12. The composite material as claimed in claim 8 wherein said siloxy-containing compound is selected from the group consisting of acetoxysilanes, oximosilanes, alkoxysilanes, isopropenoxysilanes, amidosilanes, aminosilanes and aminoxysilanes.

13. The composite material as claimed in claim 8 wherein said siloxy-containing compound is selected from the group consisting of tetraacetoxysilane, triacetoxy methylsilane, triacetoxy ethylsilane, tetraethyl silicate, acetoxy-functionalised polydimethylsiloxane and alkoxy-functionalised polydimethylsiloxane.

14. The composite material as claimed in claim 1 wherein said boron compound is selected from triethyl borate, diboron trioxide, tetraboron disodium heptaoxide, disodium tetraborate and boric acid.

15. The composite material as claimed in claim 1 wherein the polymeric composition has a boron concentration ranging from 0.005 wt. % to less than 0.12 wt. %.

16. The composite material as claimed in claim 1 wherein said cluster comprises at least two siloxanyl polymers each of which is covalently cross-linked with at least one siloxy-containing compound.

17. The composite material as claimed in claim 16 wherein said siloxy-containing compounds are independently selected for each siloxanyl polymer and may be the same or different.

18. The composite material as claimed in claim 1, wherein the polymeric composition has a Shore 00 hardness in the range of 20 to 80.

19. The composite material as claimed in claim 1, wherein the polymeric composition, when formed into a 0.4 g ball, bounces to a height of at least 20 cm when dropped from a height of 2m onto a flat glass surface.

20. The composite material as claimed in claim 1 comprising 1-75 vol. % of said particulate or granular material.

21. The composite material as claimed in claim 1 wherein said particulate or granular material has an average particle size in the range of 0.02-0.5 mm.

22. The composite material as claimed in claim 1 wherein said particulate or granular material is selected from the group consisting of borosilicate glass beads, sand, ground marble, polymer grains or balls, cenospheres, microspheres of plastic, ceramics or glass, and mixtures of these materials.

23. The composite material as claimed in claim 8 wherein said siloxy-containing compound is a siloxanyl polymer functionalized with at least one group selected from the group consisting of acetoxysilanes, oximosilanes, alkoxysilanes, isopropenoxysilanes, amidosilanes, aminosilanes and aminoxysilanes.